US012591908B2

(12) United States Patent
Padmanabhan et al.

(10) Patent No.: US 12,591,908 B2
(45) Date of Patent: Mar. 31, 2026

(54) ARTIFICIAL INTELLIGENCE CONSTRAINT-BASED OPTIMIZATION FOR GENERATING AND SELECTING CANDIDATE SOLUTIONS FOR PROMOTIONAL PLATFORM

(71) Applicant: Kinaxis Inc., Ottawa (CA)

(72) Inventors: Kanchana Padmanabhan, Ottawa (CA); Anneya Golob, Ottawa (CA); Brian Keng, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/749,896

(22) Filed: Jun. 21, 2024

(65) Prior Publication Data

US 2024/0346548 A1     Oct. 17, 2024

Related U.S. Application Data

(63) Continuation of application No. 17/359,908, filed on Jun. 28, 2021, now Pat. No. 12,045,851.

(Continued)

(51) Int. Cl.
*G06Q 30/0242*     (2023.01)
*G06F 40/40*     (2020.01)
(Continued)

(52) U.S. Cl.
CPC ......... *G06Q 30/0244* (2013.01); *G06F 40/40* (2020.01); *G06N 5/04* (2013.01);
(Continued)

(58) Field of Classification Search
CPC ........... G06Q 30/0244; G06Q 30/0201; G06Q 30/0202; G06Q 30/0264; G06Q 30/0276;
(Continued)

(56) References Cited

U.S. PATENT DOCUMENTS 7,783,533 B1     8/2010  Fan et al.
7,809,581 B1     10/2010  Neal et al.
(Continued)

FOREIGN PATENT DOCUMENTS

WO     2018170593 A1     9/2018

OTHER PUBLICATIONS

Forecasting and Analysis of Marketing Data using Neural Networks: A Case of Advertising and Promotion Impact Hean Lee Poh , Teo Jasic Department of Information Systems and Computer Science National University of Singapore (Year: 1995).*

(Continued)

*Primary Examiner* — Alexandru Cirnu
(74) *Attorney, Agent, or Firm* — Ruggiero McAllister & McMahon LLC

(57)     ABSTRACT

Systems and methods for constraint-based optimization, comprising: an AI demand forecasting engine, an optimization engine, a user-defined objective, and a user-defined set of constraints. Using historical sales data, the AI demand forecasting engine generates a plurality of entities, each entity defined by a placement of an item in a promotion platform; and forecasts the objective associated with each entity. The optimization engine generates a plurality of plans, each plan consisting of a unique subset of entities. Plans that violate at least one constraint are eliminated by the optimization engine, leaving a set of candidate solutions. An optimum plan is selected from the set of candidate solutions based on maximization of the objective.

15 Claims, 11 Drawing Sheets

Related U.S. Application Data

(60) Provisional application No. 63/153,111, filed on Feb. 24, 2021.

(51) Int. Cl.

| *G06N 5/04* | (2023.01) |
|---|---|
| *G06N 20/00* | (2019.01) |
| *G06Q 30/0201* | (2023.01) |
| *G06Q 30/0202* | (2023.01) |
| *G06Q 30/0241* | (2023.01) |
| *G06Q 30/0251* | (2023.01) |

(52) U.S. Cl.
CPC ......... *G06N 20/00* (2019.01); *G06Q 30/0201* (2013.01); *G06Q 30/0202* (2013.01); *G06Q 30/0264* (2013.01); *G06Q 30/0276* (2013.01)

(58) Field of Classification Search
CPC ......... G06F 40/40; G06F 40/279; G06N 5/04; G06N 20/00
See application file for complete search history.

(56) References Cited

U.S. PATENT DOCUMENTS

| 8,010,404 | B1 | 8/2011 | Wu et al. | |
|---|---|---|---|---|
| 10,255,581 | B2 | 4/2019 | Singh et al. | |
| 2003/0149938 | A1 | 8/2003 | McElfresh et al. | |
| 2004/0267676 | A1* | 12/2004 | Feng ...................... | G06Q 30/06 |
| | | | | 705/400 |
| 2005/0096963 | A1 | 5/2005 | Myr et al. | |
| 2009/0254395 | A1 | 10/2009 | Lynn et al. | |
| 2011/0238486 | A1* | 9/2011 | Liu ................... | G06Q 30/0244 |
| | | | | 705/14.42 |
| 2014/0059055 | A1 | 2/2014 | Nag et al. | |
| 2014/0156334 | A1 | 6/2014 | Meng et al. | |
| 2014/0330636 | A1 | 11/2014 | Moran et al. | |
| 2015/0006267 | A1 | 1/2015 | Cohen et al. | |
| 2015/0006268 | A1 | 1/2015 | Cohen et al. | |
| 2015/0006292 | A1 | 1/2015 | Li et al. | |
| 2017/0140414 | A1 | 5/2017 | Cohen et al. | |
| 2018/0365714 | A1 | 12/2018 | Lei et al. | |
| 2019/0147462 | A1 | 5/2019 | Ray et al. | |

OTHER PUBLICATIONS

Hean ., "Forecasting and Analysis of Marketing Data using Neural Networks: A Case of Advertising and Promotion Impact", Departmental of Informations systems and computer science, pp. 224-230.
International Patent Application No. PCT/CA2022/050254 International Search Report and Written Opinion dated May 17, 2022.
U.S. Appl. No. 17/359,908 , Notice of Allowance dated Mar. 25, 2024.
U.S. Appl. No. 17/359,908, Advisory Action dated Feb. 9, 2023.
U.S. Appl. No. 17/359,908, Advisory Action dated Jan. 18, 2023.
U.S. Appl. No. 17/359,908, Final office Action dated Nov. 7, 2022.
U.S. Appl. No. 17/359,908, Final office Action dated Oct. 19, 2023.
U.S. Appl. No. 17/359,908, Non Final Office Action dated Jul. 28, 2022.
U.S. Appl. No. 17/359,908, Non-Final office Action dated Mar. 17, 2023.

* cited by examiner

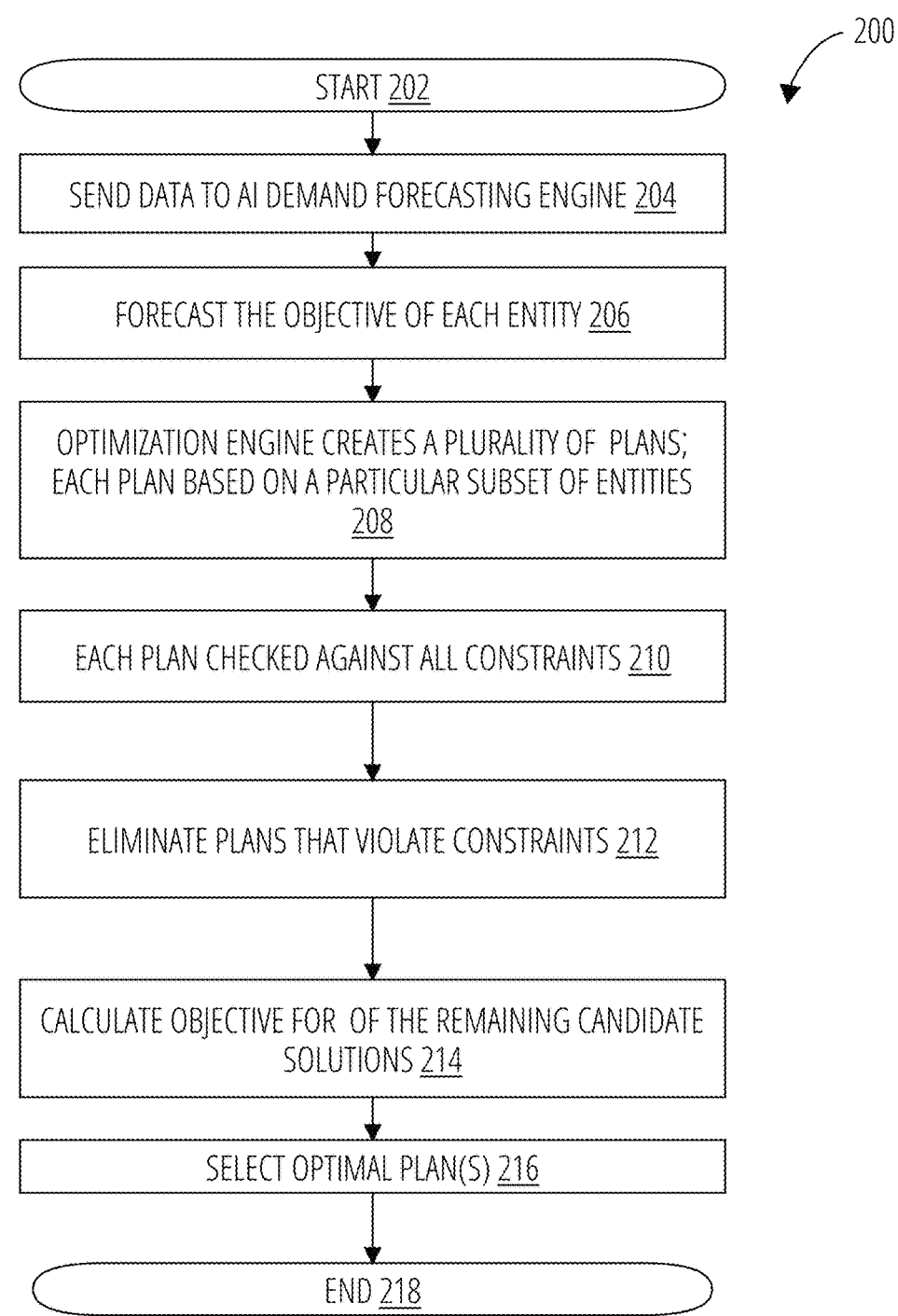

200

START 202

SEND DATA TO AI DEMAND FORECASTING ENGINE 204

FORECAST THE OBJECTIVE OF EACH ENTITY 206

OPTIMIZATION ENGINE CREATES A PLURALITY OF PLANS; EACH PLAN BASED ON A PARTICULAR SUBSET OF ENTITIES 208

EACH PLAN CHECKED AGAINST ALL CONSTRAINTS 210

ELIMINATE PLANS THAT VIOLATE CONSTRAINTS 212

CALCULATE OBJECTIVE FOR OF THE REMAINING CANDIDATE SOLUTIONS 214

SELECT OPTIMAL PLAN(S) 216

END 218

FIG. 2

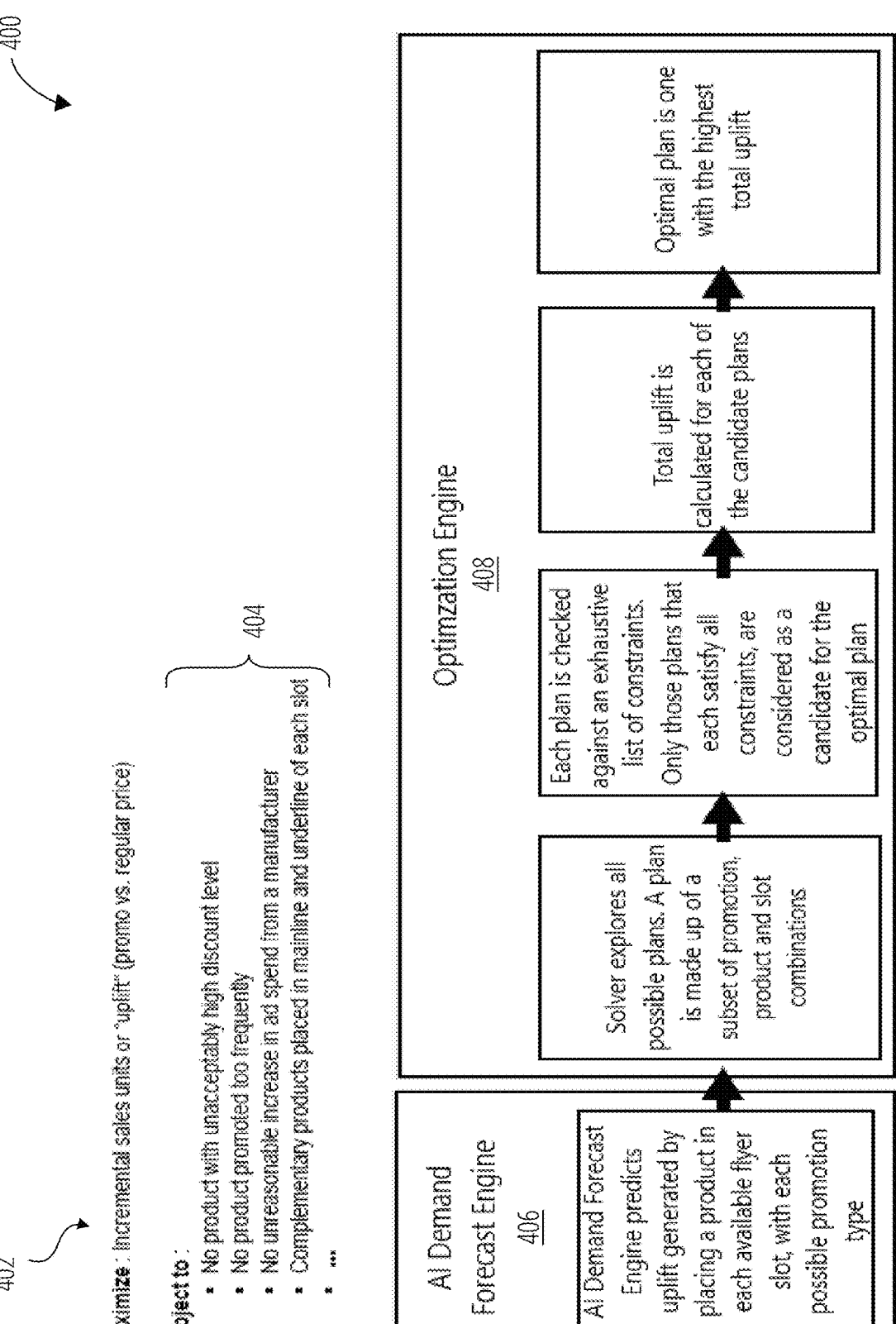

400

402

Maximize: incremental sales units or "uplift" (promo vs. regular price)

Subject to :
- No product with unacceptably high discount level
- No product promoted too frequently
- No unreasonable increase in ad spend from a manufacturer
- Complementary products placed in mainline and underline of each slot
- ...

404

Optimization Engine
408

Optimal plan is one with the highest total uplift

Total uplift is calculated for each of the candidate plans

Each plan is checked against an exhaustive list of constraints. Only those plans that each satisfy all constraints, are considered as a candidate for the optimal plan Solver explores all possible plans. A plan is made up of a subset of promotion, product and slot combinations

AI Demand Forecast Engine
406

AI Demand Forecast Engine predicts uplift generated by placing a product in each available flyer slot, with each possible promotion type

| Item | Ad Week | Base Forecast (no flyer) | | Flyer Position | Promotion | Promotion Forecast | Predicted Uplift |
|---|---|---|---|---|---|---|---|
| 602 | 604 | 606 | | 608 | 610 | 612 | 614 |
| CEREAL 1 | 2019-07-04 | 200 | 616 | Page 1, Feature 6 | BOGO | 2000 | 1800 |
| CEREAL 1 | 2019-07-04 | 200 | 618 | Page 10, Line Item 4 | BOGO | 1200 | 1000 |
| CEREAL 1 | 2019-07-04 | 200 | 620 | Page 1, Feature 6 | 2/$6 | 1000 | 800 |
| CEREAL 1 | 2019-07-04 | 200 | 622 | Page 10, Line Item 4 | 2/$6 | 600 | 400 |
| CEREAL 2 | 2019-07-04 | 1000 | 624 | Page 1, Feature 6 | BOGO | 2500 | 1500 |
| CEREAL 2 | 2019-07-04 | 1000 | 626 | Page 10, Line Item 4 | BOGO | 2000 | 1000 |
| CEREAL 2 | 2019-07-04 | 1000 | 628 | Page 1, Feature 6 | 2/$5 | 1500 | 500 |
| CEREAL 2 | 2019-07-04 | 1000 | 630 | Page 10, Line Item 4 | 2/$5 | 1300 | 300 |

| Item (702) | Ad Week (704) | Base Forecast (no flyer) (706) | Flyer Position (708) | Promotion (710) | Promotion Forecast (712) | Predicted Uplift (714) | ON/OFF (716) |
|---|---|---|---|---|---|---|---|
| CEREAL 1 (MANUF # 1) | 2019-07-04 | 200 | 718 Page 1, Feature 6 | BOGO | 2000 | 1800 | OFF |
| | 2019-07-04 | 200 | 720 Page 10, Line Item 4 | BOGO | 1200 | 1000 | OFF |
| | 2019-07-04 | 200 | 722 Page 1, Feature 6 | 2/$6 | 1000 | 800 | ON |
| | 2019-07-04 | 200 | 724 Page 10, Line Item 4 | 2/$6 | 600 | 400 | OFF |
| CEREAL 2 (MANUF # 2) | 2019-07-04 | 1000 | 726 Page 1, Feature 6 | BOGO | 2500 | 1500 | OFF |
| | 2019-07-04 | 1000 | 728 Page 10, Line Item 4 | BOGO | 2000 | 1000 | OFF |
| | 2019-07-04 | 1000 | 730 Page 1, Feature 6 | 2/$5 | 1500 | 500 | OFF |
| | 2019-07-04 | 1000 | 732 Page 10, Line Item 4 | 2/$5 | 1300 | 300 | ON |
| CEREAL 3 (MANUF # 1) | 2019-07-11 | 100 | 734 Page 2, Feature 7 | BOGO | 1500 | 1400 | OFF |
| | 2019-07-11 | 100 | 736 Page 12, Line Item 5 | BOGO | 800 | 700 | OFF |
| | 2019-07-11 | 100 | 738 Page 2, Feature 7 | 2/$6 | 1000 | 900 | OFF |
| | 2019-07-11 | 100 | 740 Page 12, Line Item 5 | 2/$6 | 300 | 200 | ON |
| *** | *** | *** | *** | *** | *** | *** | *** |

TOTAL PREDICTED UPLIFT = 1300

| Plan | Entities | | Total Uplift | |
|---|---|---|---|---|
| 1 | 618, 626 | | 3300 | |
| 2 | 618, 626, 634 | | 4700 | |
| 3 | 620, 626, 638 | | 4400 | |
| 4 | 618, 630, 634 | | 3700 | |
| 5 | 626, 634 | | 2900 | |
| 6 | 622, 630, 636 | | 2000 | |
| 7 | 622, 632, 640 | | 1300 | |
| 8 | 618, 620, 626 | | 3500 | |

802          804          806

| Plan | Entities | Total Uplift | Violation? | Candidate solution? |
|---|---|---|---|---|
| 1 | 618, 626 | 3300 | Yes - Constraint 3 | x |
| 2 | 618, 626, 634 | 4700 | Yes - Constraint 2 | x |
| 3 | 620, 626, 638 | 4400 | No | YES |
| 4 | 618, 630, 634 | 3700 | Yes - Constraint 2 | x |
| 5 | 626, 634 | 2900 | Yes - Constraint 3 | x |
| 6 | 622, 630, 636 | 2000 | Yes - Constraint 2 | x |
| 7 | 622, 632, 640 | 1300 | No | YES |
| 8 | 618, 620, 626 | 3500 | Yes - Constraint 1 | x |

802    902    904

| | Constraints |
|---|---|
| 1 | An item cannot appear twice in the same flyer |
| 2 | A flyer position can only include an item from the same manufacturer |
| 3 | All three items must appear in the flyer |

| Item | Ad Week | Base Forecast (no flyer) | Flyer Position | Promotion | Promotion Forecast | Predicted Uplift | ON/OFF |
|---|---|---|---|---|---|---|---|
| CEREAL 1 (MANUF # 1) | 2019-07-04 | 200 | 718 ⌒ Page 1, Feature 6 | BOGO | 2000 | 1800 | ON |
| | 2019-07-04 | 200 | Page 10, Line Item 4 | BOGO | 1200 | 1000 | OFF |
| | 2019-07-04 | 200 | Page 1, Feature 6 | 2/$6 | 1000 | 800 | OFF |
| | 2019-07-04 | 200 | Page 10, Line Item 4 | 2/$6 | 600 | 400 | OFF |
| CEREAL 2 (MANUF # 2) | 2019-07-04 | 1000 | Page 1, Feature 6 | BOGO | 2500 | 1500 | OFF |
| | 2019-07-04 | 1000 | 728 ⌒ Page 10, Line Item 4 | BOGO | 2000 | 1000 | ON |
| | 2019-07-04 | 1000 | Page 1, Feature 6 | 2/$5 | 1500 | 500 | OFF |
| | 2019-07-04 | 1000 | Page 10, Line Item 4 | 2/$5 | 1300 | 300 | OFF |
| CEREAL 3 (MANUF # 1) | 2019-07-11 | 100 | 734 ⌒ Page 2, Feature 7 | BOGO | 1500 | 1400 | ON |
| | 2019-07-11 | 100 | Page 12, Line Item 5 | BOGO | 800 | 700 | OFF |
| | 2019-07-11 | 100 | Page 2, Feature 7 | 2/$6 | 1000 | 900 | OFF |
| | 2019-07-11 | 100 | Page 12, Line Item 5 | 2/$6 | 300 | 200 | OFF |
| *** | *** | *** | *** | *** | *** | *** | *** |

TOTAL PREDICTED UPLIFT = 3200

FIG. 10

ARTIFICIAL INTELLIGENCE CONSTRAINT-BASED OPTIMIZATION FOR GENERATING AND SELECTING CANDIDATE SOLUTIONS FOR PROMOTIONAL PLATFORM

The present application claims the benefit of U.S. Provisional Patent Application No. 63/153,111 filed Feb. 24, 2021, and is a continuation of U.S. patent application Ser. No. 17/359,908 filed Jun. 28, 2021, both of which are expressly incorporated by reference in their entirety herein.

BACKGROUND

Currently, promotions are planned more or less in isolation: a planner selects a set of products (or items) to promote in some way, between one or more date ranges. Once a promotion is planned, a forecast is generated for use in a supply chain system, but is typically not used to inform the choice of whether to promote an item or how to promote that item. This can result in items being promoted unnecessarily (e.g. promoting an item when demand is already exceedingly high and won't create enough additional demand to justify its cost) or items failing to be promoted at the best possible times.

One approach is to design a constraint-based optimization that can be used to identify combinations of items and promotions, These combinations can be placed in an advertisement flyer every week, resulting in a plan for an entire year of flyers.

There are, however, several technical difficulties in solving this problem. One approach is to model this as a combined linear-programming and machine-learning problem; while trivial for real-valued (continuous) constraints, objective-functions for this problem involve optimizations across real, integer, and Boolean variables, which is NP-complete (nondeterministic polynomial-time complete) and cannot be solved in polynomial time, even with nearest-neighbor simplifications.

A subsequent approach is to consider a constraint-based optimization mixed with machine-learning from historical data based on a mixed-linear-programming approach (MILP). However, even before the optimization could be performed, the machine learning (ML) problem was found to grow cubically with the number of variables and constraints, and so could not be solved feasibly.

In addition, there is technological uncertainty in how to reduce the ML problem so that it can scale linearly, and in how to the partition the input time-series and define approximations for an accurate solution to the NP-complete problem.

BRIEF SUMMARY

Disclosed herein is a method and system that combines machine-learning and optimization for solving constraint problems, where traditional linear programming is not possible due to mixed constraints (real, integer and Boolean). In some embodiments, the method and system each encode constraints in a graph-based approach and defines a framework to map multiple machine learning (ML) dimensions to constraints as nodes within the graph. Through constraint grouping and dimension reduction approximations, scaling can be reduced from $O(N^3)$ to $O(N)$, thereby increasing computer efficiency.

Disclosed herein is a method and system in which a demand for every item in a retailer's 'universe' (that is, every item that the retailer is planning to stock and sell) is forecasted, assuming that a given item will be sold at a regular price (without any special promotion), as well as sold with the application of one or more candidate promotions. These forecasts can be used to calculate the anticipated cost of every promotion and its overall effect on sales. This information is used to formulate an optimization problem that allows for a suggestion as to how, and when, to promote which items, in order to maximize overall sales.

In providing an optimal promotional plan, the systems and methods provide an optimal combination of items to promote, optimal mechanics to promote the combination of items (that is, placement of the promotion), an optimal time of promotion, and so forth. However, the problem of identifying an optimal combination of items is not straightforward.

This problem is flexible, in that a number of variables can be changed; for example: the quantity being optimized (total items sold, revenue, etc.); one or more arbitrary constraints can be specified to limit the total cost of promotions within individual brands; the frequency with which items are promoted; the total number of promotions to create etc. This solution provides a comprehensive approach to promotion planning that considers all possibilities simultaneously, which guards against implementing unnecessary promotions and overlooking more obscure promotions.

Disclosed herein is a method and system for constraint-based optimization through a generalized methodology for forecasting future time-series data at multiple time horizons and resolutions from high volumes of sparse historical data with optimization objective-functions across real, integer, and Boolean variables.

The methodology can accurately forecast a system response to small perturbations to subsets of variables (among many hundreds), which result in millions to billions of combinations when optimizing against multiple objectives/constraints.

In one aspect, a computer-implemented method for constraint-based optimization, the method includes: receiving, by an AI demand forecasting engine, historical data related to sales of items and promotion design information; generating, by the AI demand forecasting engine, a plurality of entities, each entity defined by a placement of an item in a promotion platform; forecasting, by the AI demand forecasting engine, an objective associated with each entity; generating, by an optimization engine, a plurality of plans, each plan consisting of a unique subset of entities; generating, by the optimization engine, one or more candidate solutions by eliminating plans that violate at least one constraint; and selecting, by the optimization engine, an optimum plan from the one or more candidate solutions based on maximization of the objective.

The computer-implemented method may also include promotion design information that includes: flyer design information, television advertising information, store type, store region, loyalty programs, and promotion mechanics.

The computer-implemented method may also include historical data and promotion design information that comprises: available ad slots; holidays and seasonality; ranging and regular price; trends and novelty; candidate promotion types; and item attributes.

The computer-implemented method may also further include: applying, by the AI demand forecasting engine, a feature engineering pipeline to the historical data; transforming, by the feature engineering pipeline, a text-based description of the promotion design information into numeric features; and encoding, by the feature engineering pipeline, one or more attributes of each item.

The computer-implemented method may also include an AI demand forecasting engine that uses a machine learning model selected from at least one of: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

The computer-implemented method may further include: grouping together, by the optimization engine, a subset of items, based on the constraints and a historical analysis of co-occurrence of promotions; using, by the optimization engine, Boolean variables to generate the plurality of plans; and applying, by the optimization engine, a branch-and-cut approach to maximize the objective. Other technical features may be readily apparent to one skilled in the art from the following figures, descriptions, and claims.

In one aspect, a system includes a processor. The system also includes a memory storing instructions that, when executed by the processor, configure the system to: receive, by an AI demand forecasting engine, historical data related to sales of items and promotion design information; generate, by the AI demand forecasting engine, a plurality of entities, each entity defined by a placement of an item in a promotion platform; forecast, by the AI demand forecasting engine, an objective associated with each entity; generate, by an optimization engine, a plurality of plans, each plan consisting of a unique subset of entities; generate, by the optimization engine, one or more candidate solutions by eliminating plans that violate at least one constraint; and select, by the optimization engine, an optimum plan from the one or more candidate solutions based on maximization of the objective.

The system may also include promotion design information that includes: flyer design information, television advertise information, store type, store region, loyalty programs, and promotion mechanics.

The system may also include historical data and promotion design information that comprises: available ad slots; holidays and seasonality; ranging and regular price; trends and novelty; candidate promotion types; and item attributes.

The system may also include memory storing instructions that, when executed by the processor, further configure the system to: apply, by the AI demand forecasting engine, a feature engineering pipeline to the historical data; transform, by the feature engineering pipeline, a text-based description of the promotion design information into numeric features; and encode, by the feature engineering pipeline, one or more attributes of each item.

The system may also a AI demand forecast engine that uses a machine learning model selected from at least one of: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

The system may also include memory storing instructions that, when executed by the processor, further configure the system to: group together, by the optimization engine, a subset of items, based on the constraints and a historical analysis of co-occurrence of promotions; use, by the optimization engine, Boolean variables to generate the plurality of plans; and apply, by the optimization engine, a branch-and-cut approach to maximize the objective. Other technical features may be readily apparent to one skilled in the art from the following figures, descriptions, and claims.

In one aspect, a non-transitory computer-readable storage medium, the computer-readable storage medium including instructions that when executed by a computer, cause the computer to: receive, by an AI demand forecasting engine, historical data related to sales of items and promotion design information; generate, by the AI demand forecasting engine, a plurality of entities, each entity defined by a placement of an item in a promotion platform; forecast, by the AI demand forecasting engine, an objective associated with each entity; generate, by an optimization engine, a plurality of plans, each plan consisting of a unique subset of entities; generate, by the optimization engine, one or more candidate solutions by eliminating plans that violate at least one constraint; and select, by the optimization engine, an optimum plan from the one or more candidate solutions based on maximization of the objective.

The computer-readable storage medium may also include promotion design information that includes: flyer design information, television advertise information, store type, store region, loyalty programs, and promotion mechanics.

The computer-readable storage medium may also include historical data and promotion design information that comprises: available ad slots; holidays and seasonality; ranging and regular price; trends and novelty; candidate promotion types, and item attributes.

The computer-readable storage medium may also include instructions that further configure the computer to: apply, by the AI demand forecasting engine, a feature engineering pipeline to the historical data; transform, by the feature engineering pipeline, a text-based description of the promotion design information into numeric features; and encode, by the feature engineering pipeline, one or more attributes of each item.

The computer-readable storage medium may also include an AI demand forecast engine that uses a machine learning model selected from at least one of: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

The computer-readable storage medium may also include instructions that further configure the computer to: group together, by the optimization engine, a subset of items, based on the constraints and a historical analysis of co-occurrence of promotions; use, by the optimization engine, Boolean variables to generate the plurality of plans; and apply, by the optimization engine, a branch-and-cut approach to maximize the objective. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL
VIEWS OF THE DRAWINGS

To easily identify the discussion of any particular element or act, the most significant digit or digits in a reference number refer to the figure number in which that element is first introduced. Like reference numbers and designations in the various drawings indicate like elements.

FIG. 2 illustrates a block diagram of a method in accordance with one embodiment of a constraint-based optimization.

FIG. 4 illustrates an example in accordance with one embodiment of a constraint-based optimization.

FIG. 6 illustrates am example of uplift in accordance with one embodiment of a constraint-based optimization.

FIG. 7 illustrates an example of a plan in accordance with one embodiment of a constraint-based optimization.

FIG. 9 illustrates an example of checking the plans of FIG. 8 against constraints.

FIG. 10 illustrates an optimal plan based on FIG. 7.

DETAILED DESCRIPTION

The method and system can each comprise: a Machine Learning (ML) Demand Forecasting Engine; a Constraints Engine; an Objective and an Optimization Engine.

In some embodiments, constraint-based optimization are used to identify combination of items and promotions that can be put on an advertisement flyer every week and plan for the entire year of flyers together.

Figure 1:
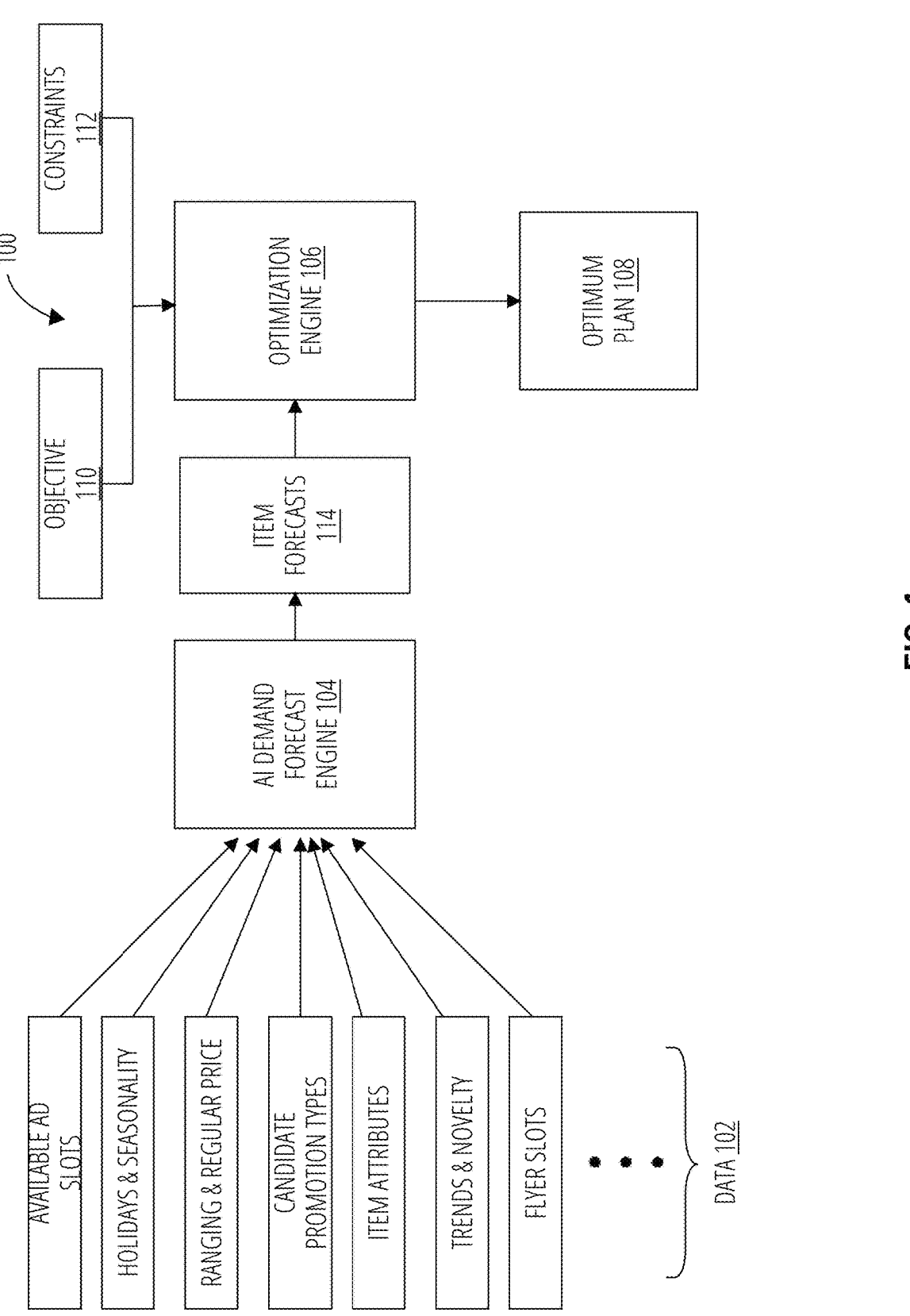
FIG. 1 illustrates a system in accordance with one embodiment of a constraint-based optimization.

FIG. 1 illustrates a system 100 in accordance with one embodiment of constraint-based optimization.

An AI demand forecasting AI demand forecast engine 104 (which is a machine learning model) utilizes all available data 102 to generate accurate forecasts. The data can include historical data and flyer design information, such as slot type, number of pages, and the like. In FIG. 1, example of data 102 that can be utilized by AI demand forecast engine 104 includes: available ad slots; holidays and seasonality; ranging and regular price, candidate promotion types; item attributes; and trends and novelty. The AI demand forecast engine 104 then generates item forecasts 114 for all promotion and slot combinations, which are in turn fed into optimization engine 106. In addition, a user specifies an objective 110 to optimize and constraints 112 to ensure that a realistic plan is generated by the optimization engine 106. An optimum plan 108 is generated that proposes a promotion and a set of items for each slot over a time range that optimizes the objective 110.

FIG. 2 illustrates a block diagram 200 of a method in accordance with one embodiment of a constraint-based optimization.

As described in FIG. 1, an AI demand forecast engine 104 can be used to forecast for all combinations of entities over which an optimization is to be run. At step 204, data is sent to the AI demand forecast engine 104. In some embodiments, the data includes historical data and promotion design information. For example, the promotion design information can be flyer design information, such as slot type, number of pages, and the like. Another example of promotion design information can be television advertising information, such as time of day, length of the ad, and so forth. Other non-limiting examples of promotion design include store type, and region; loyalty versus non-loyalty; and promotion mechanics (for example, by 1 item and get 50% on a second item).

At step 206, the AI demand forecast engine 104 is leveraged to forecast the objective 110 by placing an item in each available flyer slot, with each possible promotion type; such a placement is termed an "entity". In some embodiments, the objective 110 is the variable that the optimization engine 106 maximizes. Examples of an objective 110 can include uplift, sales units, and sales dollars. The objective 110 can include a combination of items to maximize; for example objective 110 can include the maximization of sales units, sales dollars and incorporating margins.

At step 208, the optimization engine 106 creates a plurality of plans, with each plan based on a particular subset of entities.

A mix of real integer and Boolean conditions may be encoded and supplied to the optimization engine 106, as constraints that the output of the optimization engine 106 is required to satisfy. At step 210, each plan is checked against all constraints 112. At step 212, the optimization engine 106 eliminates plans that violate at least one constraint. Only the remaining subset of candidate solutions (that do not violate the constraints) are used to calculate the objective 110 for each candidate solution in the subset, at step 214. The candidate solution(s) that provide maximize the objective 110 are selected as the optimal plan(s) at step 216.

Figure 3:
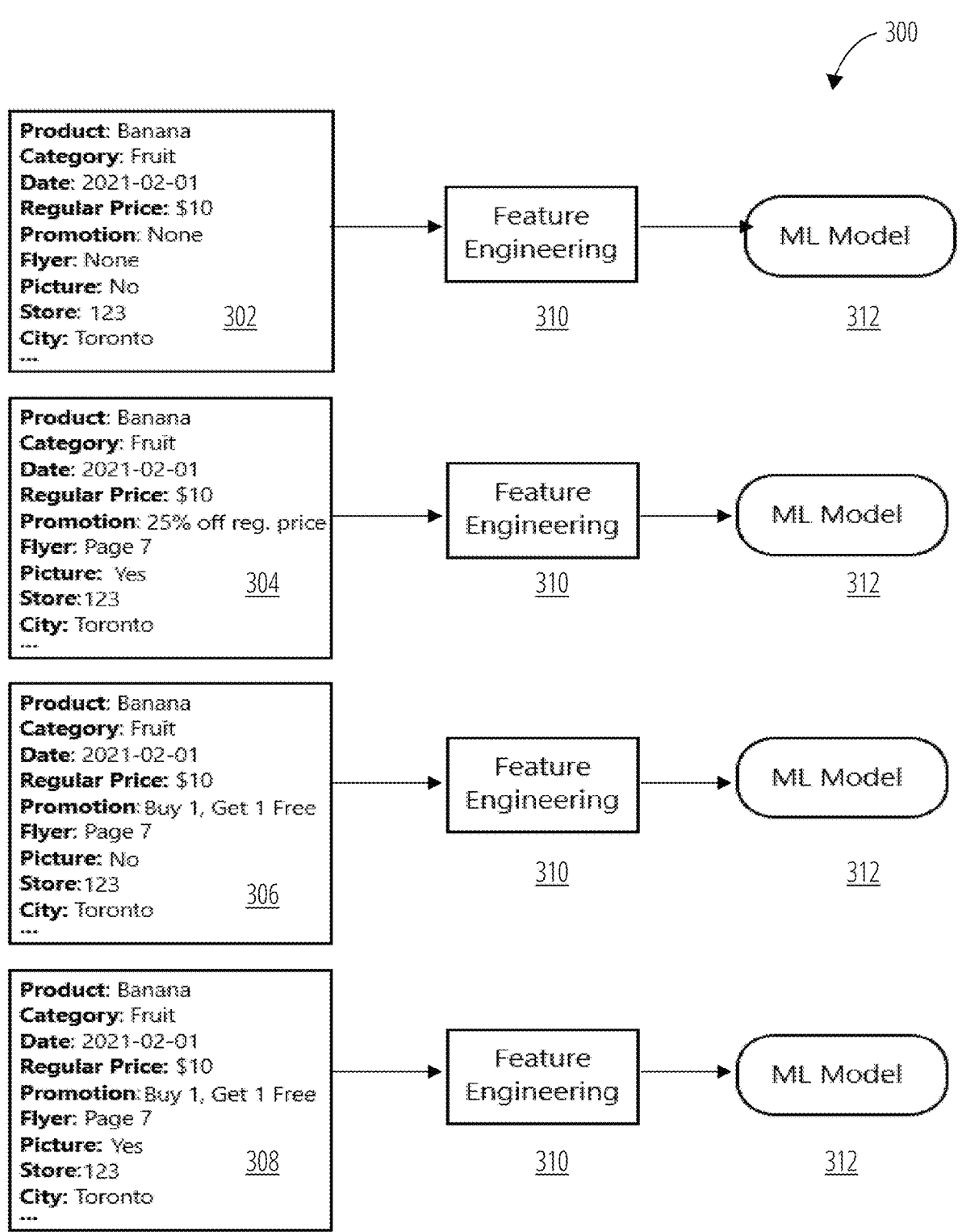
FIG. 3 illustrates an aspect of the subject matter in accordance with one embodiment.

FIG. 3 illustrates an aspect of the subject matter in accordance with one embodiment.

The AI demand forecast engine 104 (shown in FIG. 1) employs a ML model that is used to predict the demand for an item (or product) under specified conditions. The ML model answers questions of the form: 'if product X, whose regular price is 5$, is sold at a 25% discount, advertised with a colour picture on page 7 of a regional flyer that is in effect from 2021 Jan. 1 to 2021 Feb. 1, what will the demand for product X be at store Z on 2021 Jan. 15?'. Note that "product" is synonymous with "item".

A feature engineering pipeline is used to transform the text-based descriptions of promotion details into numeric features. Furthermore, numerous attributes of each product (or item) and store location are encoded. The same feature transformation pipeline is applied to several years of historical sales data, and used to train the machine learning algorithm to predict demand.

In order to achieve a tractable optimization problem, it is key that the individual predictions are independent. This rules out many common time-series prediction algorithms that would require a prediction of tomorrow's demand before one could forecast a demand, say two days, from now.

In some embodiments, gradient boosting is used to generate forecasts; the specific choice of algorithm is irrelevant as long as its outputs are independent. Once an algorithm is trained, demand for all possible placements are predicted. That is, all items (or products) in all stores on all dates with all acceptable promotions advertised in all possible flyer locations.

A subset of the predictions is illustrated in FIG. 3, where four different placements or options are shown. In all four options, the product is "Banana" in the category "Fruit", having a regular price of "$10" during the week of "2021 Feb. 1", at store "123" in the city of "Toronto".

In option 302, there are no promotions of the product, nor any flyer placement (and thus, no photo of the product in the flyer). In option 304, there is a promotion of "25% off the regular price", with a picture of the product on page 7 of the flyer. In option 306, there is a promotion of "Buy 1, Get 1 free", on page 7 of the flyer, with no picture of the product. Finally in option 308, there is a promotion of "Buy 1, Get 1 free", with a picture of the product on page 7 of the flyer.

Feature engineering 310 is used to transform the text-based descriptions of each promotion details into numeric features, before being sent to the ML Model 312 for forecasting. Non-limiting examples of machine learning models that can be used include: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

FIG. 4 illustrates an example 400 in accordance with one embodiment of a constraint-based optimization.

In example 400, the goal is to maximize the incremental sales units, or uplift, an item receives from being promoted. That is, the objective 402 is the uplift.

The constraints 404 include a list, such as: no item with unacceptably high discount level; no item promoted too frequently; no unreasonable increase in ad spend from a manufacturer; no complementary items placed in mainline and underline of each slot; an item cannot appear twice in the same flyer, a flyer slot can only include items from the same manufacturer, etc.

The AI Demand Forecast Engine 406 forecasts uplift generated by placing an item in each available flyer slot, with each possible promotion type. The placement of an item in a particular flyer slot with a particular promotion type, is an example of an entity, as discussed above.

The optimization engine 408 then explores all possible plans. A particular plan is made up of a particular subset of entities. Each plan is checked against the list of constraints 404. Only a plan that satisfies all conditions is considered as a candidate plan for the optimal plan. The total uplift is computed for each of the candidate plans. The optimal plan is one with the highest total uplift.

Figure 5:
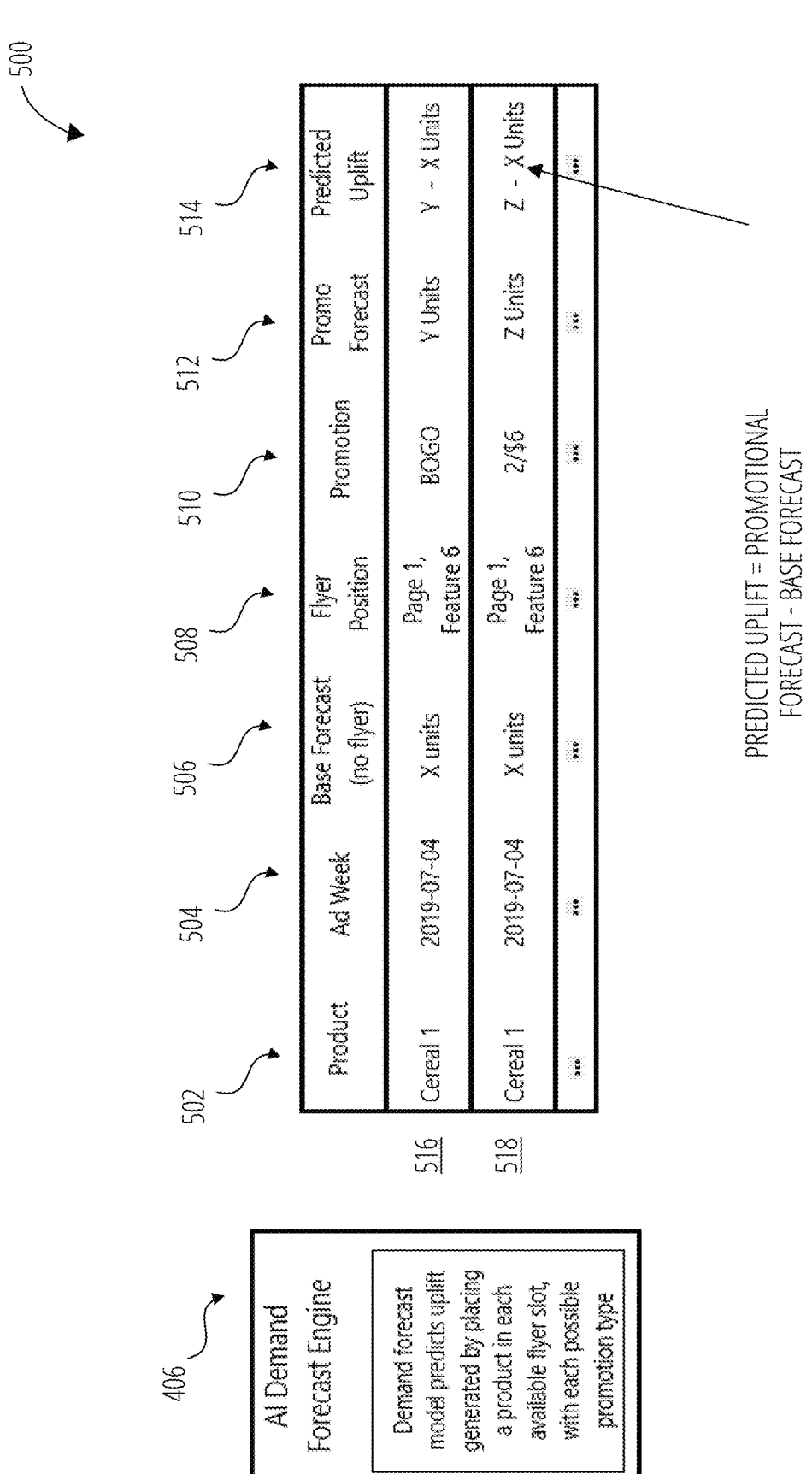
FIG. 5 illustrates an example of uplift in accordance with one embodiment of a constraint-based optimization.

FIG. 5 illustrates an example 500 of uplift. The AI Demand Forecast Engine 406 forecasts uplift generated by placing an item in each available flyer slot, with each possible promotion type. This is shown for two different promotions 510 for an item 502 placed in a particular flyer position 508. That is, two entities generated by the 406 are shown: entity 516 refers to Cereal 1 placed in a flyer during the ad week 504 of Jul. 4, 2019, at page 1, feature 6 of the flyer with the promotion 510 of "buy one, get one free" (BOGO). The base forecast 506 (that is, sales without any promotion), is 'X' units, while the promotion forecast 512 is 'Y' units. The uplift 514 is defined as the promotion forecast 512 ('Y' units) minus base forecast 506 ('X' units). Similarly, entity 518 refers to Cereal 1 placed in a flyer during the ad week 504 of Jul. 4, 2019, at page 1, feature 6 of the flyer, with the promotion 510 of "buy 2/$6". The base forecast 506 (that is, sales without any promotion), is 'X' units, while the promotion forecast 512 is 'Z' units. The uplift 514 is defined as the promotion forecast 512 ('Z' units) minus base forecast 506 ('X' units).

FIG. 6 illustrates am example 600 of uplift in accordance with one embodiment of a constraint-based optimization. As defined above, the uplift is the increase in demand for an item caused by a flyer promotion:

Uplift=Promotion forecast–Baseline forecast.

The AI Demand Forecast Engine 406 forecasts uplift 614 generated by placing an item 602 in each available flyer position 608, with each possible promotion type 610.

This is shown for two different items: Cereal 1 and Cereal 2, with four possible combinations of flyer position 608 and promotion type 610 for each cereal. The AI Demand Forecast Engine 406 forecasts the base forecast 606 and promotion forecast 612 during a given ad week 604 for each of the four combinations for each item 602. Thus, a total of eight entities are generated by the AI Demand Forecast Engine 406.

Entity 616: Ad placed week of Jul. 4, 2019, for Cereal 1, on page 1 (Feature 6) with a BOGO promotion. The base forecast is 200 units; the promotion forecast is 2000 units, resulting in an uplift of 1800 units.

Entity 518: Ad placed week of Jul. 4, 2019 for Cereal 1, on page 10 (line item 4) with a BOGO promotion. The base forecast is 200 units; the promotion forecast is 1200 units, resulting in an uplift of 1000 units.

Entity 620: Ad placed week of Jul. 4, 2019, for Cereal 1, on page 1 (Feature 6) with a 2/$6 promotion. The base forecast is 200 units; the promotion forecast is 1000 units, resulting in an uplift of 800 units.

Entity 622: Ad placed week of Jul. 4, 2019, for Cereal 1, on page 10 (line item 4) with a 2/$6 promotion. The base forecast is 200 units; the promotion forecast is 600 units, resulting in an uplift of 400 units.

Entity 624: Ad placed week of Jul. 4, 2019, for Cereal 2, on page 1 (Feature 6) with a BOGO promotion. The base forecast is 1000 units; the promotion forecast is 2500 units, resulting in an uplift of 1500 units.

Entity 626: Ad placed week of Jul. 4, 2019, for Cereal 2, on page 10 (line item 4) with a BOGO promotion. The base forecast is 1000 units; the promotion forecast is 2000 units, resulting in an uplift of 1000 units.

Entity 628: Ad placed week of Jul. 4, 2019, for Cereal 2, on page 1 (Feature 6) with a 2/$5 promotion. The base forecast is 1000 units; the promotion forecast is 1500 units, resulting in an uplift of 500 units.

Entity 630: Ad placed week of Jul. 4, 2019, for Cereal 2, on page 10 (line item 4) with a 2/$5 promotion. The base forecast is 1000 units; the promotion forecast is 1300 units, resulting in an uplift of 300 units.

It is observed that items with high base forecasts often have low uplifts (see, for example, entities 624 to 630). When maximization of uplift is the objective, items with high base forecasts that have comparable promotional forecasts, have a low predicted uplift and are less likely to be part of the optimal plan.

FIG. 7 illustrates am example 700 of a plan in accordance with one embodiment of a constraint-based optimization.

In FIG. 7, The AI Demand Forecast Engine 406 Demand forecasts uplift 714 (based on base forecasts 706 and promotion forecast 712) for 12 different entities (entity 718 to entity 736), generated from three items 702 (Cereal 1, Cereal 2, and Cereal 3) placed during ad week 704 (Jul. 4, 2019), for four different combinations of flyer position 708 and promotion type 710. In this example, Cereal 1 and Cereal 3 are made by the same manufacturer, whereas Cereal 2 is made by a different manufacturer.

The optimization engine 408 explores possible plans by turning each entity ON or OFF (item 716). A plan is made up of different subsets of item 702, flyer position 708 and promotion type 710; each plan has an associated uplift 714. In FIG. 7, the plan consists of the subset of entity 718, entity 728 and entity 736, with a total uplift of 1300 units. The optimization engine 408 does not explicitly explore all possible plans, but instead solves an equivalent mathematical problem. In some embodiments, the mathematical problem is a tree-based optimization using branch and cut for Integer Linear Programming.

In general, once the AI demand forecast engine 104 forecasts a demand for all possible options, the objective that needs to be optimized (which is based on the demand) is obtained for each option. For example, in FIG. 7, the objective is total uplift, which is calculated based on the projected demand for a given option. An entity includes the specifics of the option along with the projected objective for that option. As an example, with reference to FIG. 7: an option is specified by item 702, ad week 704, flyer position 708 and promotion type 710, while an entity is specified by a given option and associated uplift 714.

The optimization problem can then be set as a linear equation, where the choice of whether or not to implement each of the entities is represented with a Boolean variable. For example, with reference to FIG. 7, for a given plan:

Total predicted uplift =

(1 if implementing entity 718, 0 if not implementing entity 718) *

(entity 718 predicted uplift) + (1 if implementing entity 720, 0 if not implementing entity 720) * (entity 720 predicted uplift) +

(1 if implementing entity 722, 0 if not implementing entity 722) *

(entity 722 predicted uplift) + ... +

(1 if implementing entity 740, 0 if not implementing entity 740) *

(entity 740 predicted uplift).

While twelve entities are listed above, it is understood that the optimization problem can include fewer or greater than 12 entities; often greater (numbering in the millions), for all possible combinations of products/stores/dates.

In general, the goal is to optimize the objective, subject to constraints. With reference to FIG. 7, the goal is to maximize total uplift subject to a number of constraints, that are further discussed in FIG. 9. In general, these constraints are added to the linear equation above by encoding the constraints using additional Boolean variables.

Furthermore, while the embodiment shown in FIG. 7 aims to optimize total uplift, there are other objectives that can be optimized, provided the objective can be derived from the forecast demand generated by the AI demand forecast engine 104. Non-limiting examples include: maximization of total sales (by including estimates of the average price end consumers will pay when a given promotion is implemented) and total uplift.

In order to make the problem solvable in an acceptable time frame, the number of variables in the equation is reduced, by combining or removing sets of variables. Such a step enhances computer efficiency. To do this, the constraints are taken into account, while a historical analysis of the co-occurrence of promotions is performed. This analysis leads to a proposal of groups of items that can be assumed to 'belong' together. Once the number of variables has been reduced as much as possible, without compromising the usefulness of the solution, a branch-and-cut algorithm is used to solve the integer optimization problem.

In summary, in some embodiments, the system and method each finds a solution to an easier version of the problem, by pretending that the Boolean variables can take on non-integer values in the solution. The method and system each then starts with this solution, picks one of the variables that were assigned values not equal to 0 or 1 in the solution to the 'easy' or 'relaxed' problem, followed by splitting into two solution branches; in one branch, the variable is assigned a value of 0, while in the other branch, the variable is assigned a value of 1. The system and method then each computes another 'easy' solution for each of these two sub-problems, followed by comparing the value of total objective obtained by solutions having the relaxed solution—to the full problem. This is followed by determining whether other solutions with that specific variable set to 0 or 1 should be considered. Use of the branch-and-cut algorithm greatly enhances computer efficiency.

Figure 8:
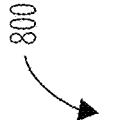
FIG. 8 illustrates an example of plans generated from FIG. 7.

FIG. 8 illustrates an example 800 of possible plans 802 generated from FIG. 7. While only eight plans are shown, it is understood that the optimization engine 408 explores all different combinations of entities. In FIG. 8, each plan 802 consists subset of entities 804 (each entity within the subset is selected by having the optimization engine 408 select 'ON' for that entity). The total uplift 806 is provided for each plan. In example 800, plans 1 and 5 consist of two entities each, while the remaining plans each consist of three entities. Plans can include more than three entities.

After the optimization engine 408 generates a complete list of plans, each plan is checked against an exhaustive list of constraints. Only a plan that satisfies all conditions is considered as a candidate solution for the optimal plan.

This is demonstrated in FIG. 9, in which each plan 802 shown in FIG. 8 is checked against a set of constraints 906. There are three constraints in this example: 1) an item cannot appear twice in the same flyer; 2) a flyer position can only include an item from the same manufacturer; and 3) all three items must appear in the flyer.

Plans 1 and 5 violate constraint #3, in that each plan consists only of two entities (and thus, two items), whereas the constraint requires the presence of all three items (or cereals). Plan 8 violates constraint #1, in that the plan has Cereal 1 appearing twice in the same flyer. Finally, plans 2, 4 and 6 each violate constraint #2, in that Cereal 1 (made by Manufacturer 1—see FIG. 7) and Cereal 2 (made by Manufacturer 2—see FIG. 7), are placed in the same flyer position. Only plans 3 and 7 satisfy constraints 906, and are subsequently considered as candidate solutions for the optimal plan.

These constraints are added to the linear equation by encoding them using additional Boolean variables. The optimization is not limited to total demand-any quantity that can be derived using the predicted demand values can be optimized. Non-limiting examples include maximization of total sales (by including estimates of the average price end consumers will pay when a given promotion is implemented), maximization of uplift (predicted demand minus baseline demand), and so on.

As stated above, in order to make the problem solvable in an acceptable time frame, the number of variables in the equation is reduced, by combining or removing sets of variables. Such a step enhances computer efficiency. To do this, the constraints are considered, while a historical analysis of the co-occurrence of promotions is performed. This analysis leads to a proposal of groups of items that can be assumed to 'belong' together. Once the number of variables has been reduced as much as possible, without compromising the usefulness of the solution, a branch-and-cut algorithm is used to solve the integer optimization problem.

In the final stage, the optimization engine 408 searches through the set of candidate solutions to find the plan with the highest uplift. The optimization engine 408 efficiently searches through all possible combinations that do not violate constraints and finds the plan with the highest total uplift. This is demonstrated in FIG. 10, in which the optimal plan is found, consisting of entity 718, entity 728 and entity 734, with a total maximum uplift of 4200 units.

Figure 11:
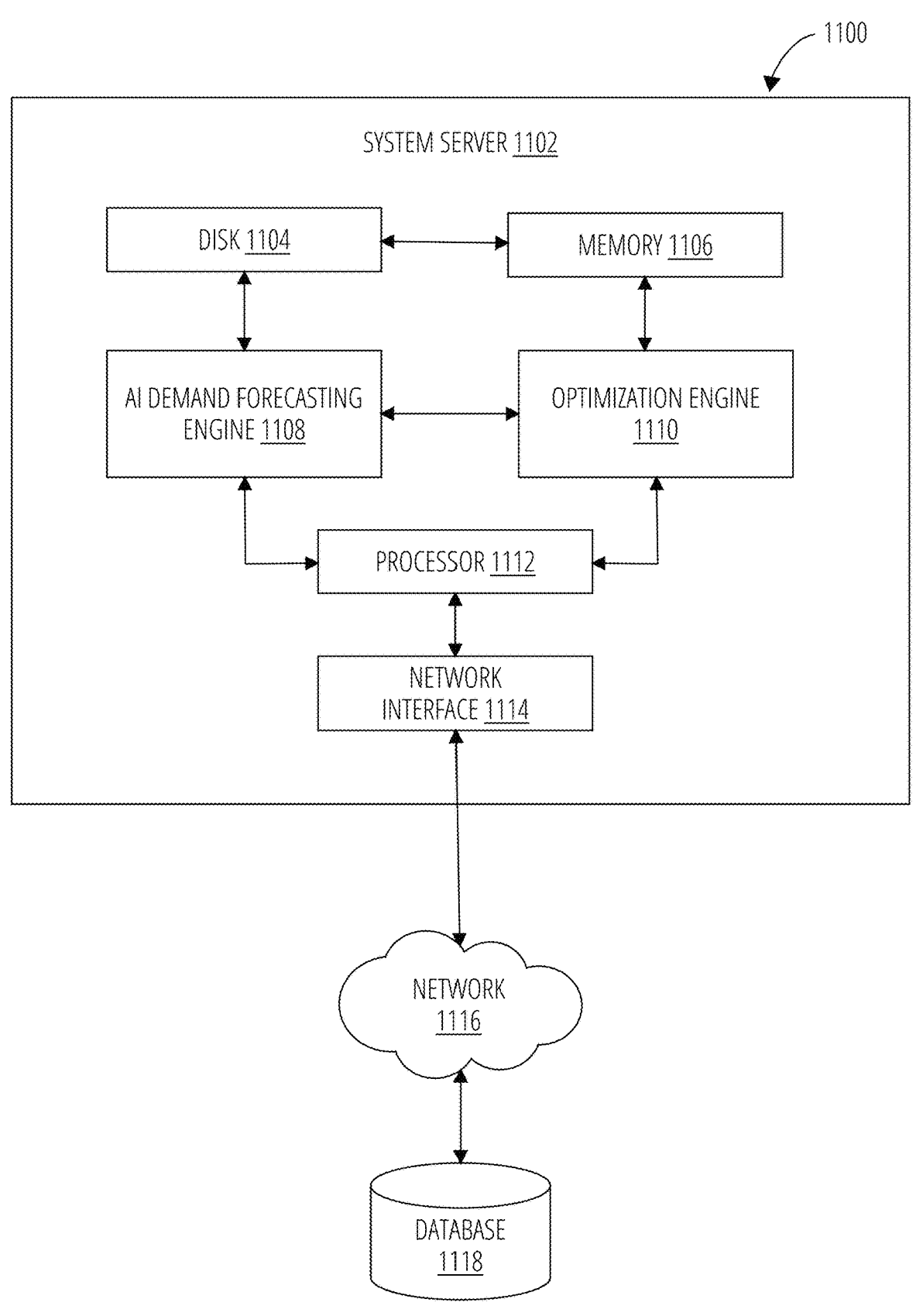
FIG. 11 illustrates an aspect of the subject matter in accordance with one embodiment.

FIG. 11 illustrates a system 800 in accordance with one embodiment.

System 1100 comprise a system server 1102, database 1118. System server 1102 can include a memory 1106, a disk 1104, a processor 1112 and a network interface 1114. While one processor 1112 is shown, the system server 1102 can comprise one or more processors. In some embodiments, memory 1106 can be volatile memory, compared with disk 1104 which can be non-volatile memory. In some embodiments, system server 1102 can communicate with database 1118 via network 1116.

System 1100 can also include additional features and/or functionality. For example, system 1100 can also include additional storage (removable and/or non-removable) including, but not limited to, magnetic or optical disks or tape. Such additional storage is illustrated in FIG. 11 by memory 1106 and disk 1104. Storage media can include volatile and nonvolatile, removable and non-removable media implemented in any method or technology for storage of information such as computer-readable instructions, data structures, program modules or other data. Memory 1106 and disk 1104 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1100. Any such non-transitory computer-readable storage media can be part of system 1100.

Communication between system server 1102 and database 1118 can be over various network types. In some embodiments, the processor 1112 may be disposed in communication with network 1116 via a network interface 1114. The network interface 1114 may communicate with the network 1116. The network interface 1114 may employ connection protocols including, without limitation, direct connect, Ethernet (for example, twisted pair 10/40/400 Base T), transmission control protocol/internet protocol (TCP/IP), token ring, IEEE 902.11a/b/g/n/x, etc. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 1100 may take place over hard-wired, cellular, Wi-Fi or Bluetooth networked components or the like. In some embodiments, one or more electronic devices of system 1100 may include cloud-based features, such as cloud-based memory storage.

Database 1118 may provide a variety of historical data for use by the AI demand forecasting engine 1108.

Using network 1116, system server 1102 can retrieve data from database 1118. The data can be saved in memory 1106 or disk 1104. In some embodiments, system server 1102 also comprise a web server, and can format resources into a format suitable to be displayed on a web browser.

A computer program (which may also be referred to or described as a software application, code, a program, a script, software, a module, or a software module) can be written in any form of programming language. This includes compiled or interpreted languages, or declarative or procedural languages. A computer program can be deployed in many forms, including as a module, a subroutine, a stand alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object, or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and system can also be implemented as, special purpose logic circuitry, for example, an FPGA (field programmable gate array) or an ASIC (application specific integrated circuit). For example, the processes and logic flows can be performed by, and system can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, for example, optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of nonvolatile memory, media, and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (e.g., a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g., a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software item or packaged into multiple software items.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:

a processor; and a memory storing instructions that, when executed by the processor, configure the system to:

receive, by an AI demand forecasting engine, historical data related to sales of items and promotion design information;

transform, by a feature engineering pipeline, the promotion design information into numeric features for use in training predictions for item demand;

train, by the AI demand forecasting engine to predict independent baseline demands and independent promotion demands, based on the historical data and the numeric features;

generate, by the AI demand forecasting engine, a plurality of entities, each entity defined by a placement of a sale item in a promotional platform;

forecast, by the AI demand forecasting engine, a baseline forecast associated with each entity and a promotional forecast associated with each entity;

forecast, by the AI demand forecasting engine, an objective associated with each entity based on the baseline forecast and the promotional forecast;

generate by an optimization engine encoded with a mix of real integers and Boolean conditions, a plurality of plans, each plan consisting of a unique subset of entities;

generate, by the optimization engine, one or more candidate solutions based on each of the plurality of plans and by eliminating plans that violate at least one constraint encoded as at least one Boolean variable of the Boolean conditions; and select, by the optimization engine, an optimum plan from the one or more candidate solutions based on optimization of the objective.

2. The system of claim 1, wherein the promotion design information comprises: flyer design information; television advertise information; store type; store region; loyalty programs; and promotion mechanics.

3. The system of claim 1, wherein the historical data is related to: holidays and seasonality; ring and regular price; trends and novelty; and item attributes.

4. The system of claim 1, wherein:

generating the one or more candidate solutions is based on evaluating a linear equation for each of the plurality of plans;

and wherein:

the linear equation is based on: the plurality of entities; the objective associated with each entity; and the at least one constraint;

and wherein:

the plurality of entities are each represented by a first Boolean value, and each constraint is represented by a second Boolean value.

5. The system of claim 1, wherein the AI demand forecast engine uses a machine learning model selected from at least one of: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

6. A non-transitory computer-readable storage medium, the computer-readable storage medium including instructions that when executed by a computer, cause the computer to:

receive, by an AI demand forecasting engine, historical data related to sales of items and promotion design information;

transform, by a feature engineering pipeline, the promotion design information into numeric features for use in training predictions for item demand;

train, by the AI demand forecasting engine to predict independent baseline demands and independent promotion demands, based on the historical data and the numeric features;

generate, by the AI demand forecasting engine, a plurality of entities, each entity defined by a placement of a sale item in a promotional platform;

forecast, by the AI demand forecasting engine, a baseline forecast associated with each entity and a promotional forecast associated with each entity;

forecast, by the AI demand forecasting engine, an objective associated with each entity based on the baseline forecast and the promotional forecast;

generate by an optimization engine encoded with a mix of real integers and Boolean conditions, a plurality of plans, each plan consisting of a unique subset of entities;

generate, by the optimization engine, one or more candidate solutions based on each of the plurality of plans and by eliminating plans that violate at least one constraint encoded as at least one Boolean variable of the Boolean conditions; and select, by the optimization engine, an optimum plan from the one or more candidate solutions based on optimization of the objective.

7. The computer-readable storage medium of claim 6, wherein the promotion design information comprises: flyer design information;

television advertise information; store type; store region; loyalty programs; and promotion mechanics.

8. The computer-readable storage medium of claim 6, wherein the historical data is related to: holidays and seasonality; ring and regular price; trends and novelty; and item attributes.

9. The computer-readable storage medium of claim 6, wherein:

generating the one or more candidate solutions is based on evaluating a linear equation for each of the plurality of plans;

and wherein:

the linear equation is based on: the plurality of entities; the objective associated with each entity; and the at least one constraint;

and wherein:

the plurality of entities are each represented by a first Boolean value, and each constraint is represented by a second Boolean value.

10. The computer-readable storage medium of claim 6, wherein the AI demand forecast engine uses a machine learning model selected from at least one of: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

11. A computer-implemented method comprising:

receiving, by an AI demand forecasting engine, historical data related to sales of items and promotion design information;

transforming, by a feature engineering pipeline, the promotion design information into numeric features for use in training predictions for item demand;

training, by the AI demand forecasting engine to predict independent baseline demands and independent promotion demands, based on the historical data and the numeric features;

generating, by the AI demand forecasting engine, a plurality of entities, each entity defined by a placement of a sale item in a promotional platform;

forecasting, by the AI demand forecasting engine, a baseline forecast associated with each entity and a promotional forecast associated with each entity;

forecasting, by the AI demand forecasting engine, an objective associated with each entity based on the baseline forecast and the promotional forecast;

generating by an optimization engine encoded with a mix of real integers and Boolean conditions, a plurality of plans, each plan consisting of a unique subset of entities;

generating, by the optimization engine, one or more candidate solutions based on each of the plurality of plans and by eliminating plans that violate at least one constraint encoded as at least one Boolean variable of the Boolean conditions; and selecting, by the optimization engine, an optimum plan from the one or more candidate solutions based on optimization of the objective.

12. The computer-implemented method of claim 11, wherein the promotion design information comprises: flyer design information; television advertising information; store type; store region; loyalty programs; and promotion mechanics.

13. The computer-implemented method of claim 11, wherein the historical data is related to: holidays and seasonality; ranging and regular price; trends and novelty; and item attributes.

14. The computer-implemented method of claim 11, wherein:

generating the one or more candidate solutions is based on evaluating a linear equation for each of the plurality of plans;

and wherein:

the linear equation is based on: the plurality of entities; the objective associated with each entity; and the at least one constraint;

and wherein:

the plurality of entities are each represented by a first Boolean value, and each constraint is represented by a second Boolean value.

15. The computer-implemented method of claim 11, wherein the AI demand forecasting engine uses a machine learning model selected from at least one of: Deep Learning, Gradient Boosted Trees, Random Forest, Kernel Density Estimators, Gaussian Processes, Isolation Forests, Generalized Additive Models, Representation Learning, Non-parametric techniques, Econometric Models, Bayesian Models, Time-Series Models, and Bayesian Additive Regression Trees.

* * * * *